INVENTORS
HAROLD B. GOTAAS
BY WILLIAM J. OSWALD
Lothrop + West
ATTORNEYS

United States Patent Office

2,867,945
Patented Jan. 13, 1959

2,867,945

PROCESS OF PHOTOSYNTHETIC CONVERSION OF ORGANIC WASTE BY ALGAL-BACTERIAL SYMBIOSIS

Harold B. Gotaas, Berkeley, and William J. Oswald, Concord, Calif., assignors to the Regents of the University of California, a corporation Application October 19, 1955, Serial No. 541,448

14 Claims. (Cl. 47—58)

Our invention relates to a process of simultaneously disposing of organic wastes, such as sewage and other fluent wastes, together with the production of algae and comparable photosynthetic micro-organisms utilizable as a source of nutrients, such as food. For a long time it has been the practice, particularly in metropolitan areas, to dispose of sewage and organic wastes by various treatment processes. These wastes are such as to contain carbon, nitrogen and various and sundry other constituents including essential nutrients and many sorts of bacteria. The bacteria are effective to assist in the disposition of the waste by utilizing oxygen, usually from the atmosphere, in connection with the carbon and other chemical materials in the waste so that the resulting product is dosposable with greater facility. Often the disposable material contains constituents valuable for use as fertilizer and the like and where economically feasible such materials are reclaimed. Processes of this sort, however, require relatively long times of detention or artificial oxygenation, require large areas relative to the quantity of organic waste available and normally provide products which are simply more easily disposable rather than inherently valuable.

From another aspect, there has been in more recent years a good deal of work done on the mass culture of various photosynthetic micro-organisms, such as the algae, for the purpose of augmenting the world's food supply since algae (such as *Chlorella pyrenoidosa*) are largely composed of protein, fat and other biochemical materials suitable for animal (including human) consumption.

It is therefore an object of our invention to provide a process of conversion of organic waste into useful material.

Another object of our invention is to provide a source of nutrient materials for algae or comparable protein providing materials.

Another object of our invention is to provide a process of symbiosis by which organic waste containing bacteria and photosynthetic micro-organisms can each contribute economically and effectively to the life cycle of the other.

A still further object of our invention is to provide a process for economically disposing of organic waste.

A still further object of the invention is to provide a process for mass culture of photosynthetic micro-organisms.

An additional object of the invention is to provide a process of symbiosis requiring a relatively small amount of area and plant for the volume of materials handled.

An additional object of the invention is to provide a process in which energy derived from light, such as sunlight, is effective to provide an energy gain in the products of the process.

Another object of the invention is to provide a means of utilizing light energy effectively and economically.

A still further object of the invention is to provide a substantially self-sustaining, artificially maintained symbiosis in which organic waste-containing bacteria and photosynthetic micro-organisms are commingled.

A still further object of the invention is to provide a process for reclaiming the aqueous material from effluent organic waste in a condition for reuse.

Other objects, together with the foregoing, are attained in the process described in the accompanying description and illustrated by the accompanying drawings, in which—

Figure 1:
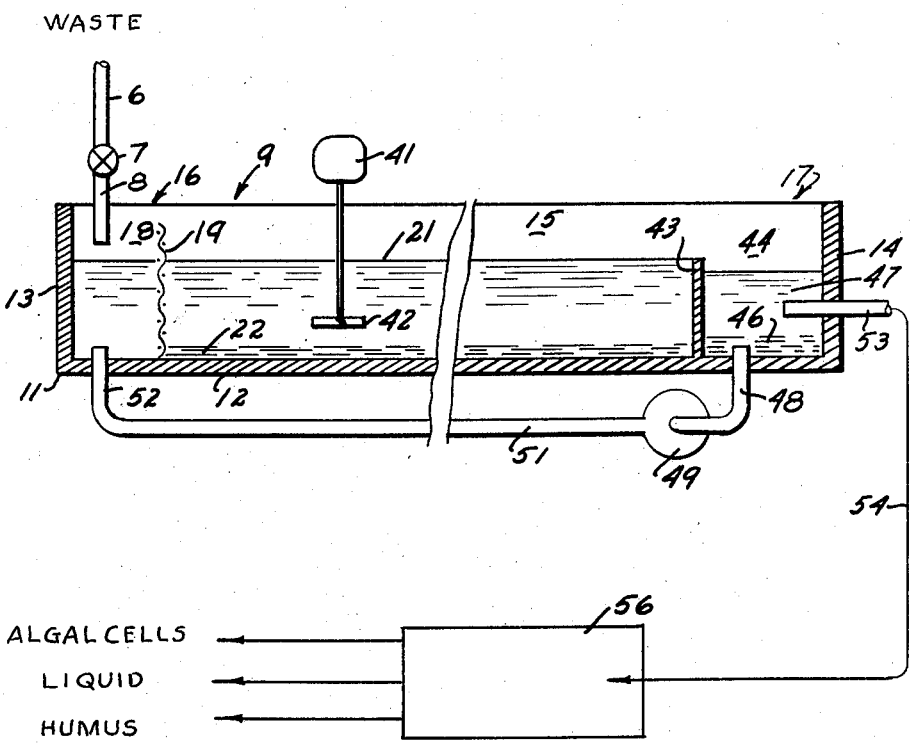
Figure 1 is a diagrammatic cross section on a vertical, longitudinal plane through one form of apparatus useful in carrying out the process of our invention, a portion being broken away.

While the process of our invention can be viewed from any one of its several aspects which include the reclamation of organic waste, the production of protein containing algae, the utilization of sunlight and the reclamation of the liquid vehicle in organic waste, it is conveniently considered primarily from the aspect of organic waste disposal.

Organic waste from metropolitan areas, for example, contains not only water-borne human sewage but also may contain various and sundry sorts of commercial wastes having a substantial carbon, nitrogen and other nutrient content. The utilization of the term "organic waste" herein is intended to refer not only to human sewage but also to other sewer borne materials, particularly when they are carbon containing and also when they are accompanied by various of the usual bacteria found in the normal sewage system. Reference is also made to agricultural and industrial by-products and wastes and which must be disposed of other than through a sewer system. The usual application is to sewage, used as an example herein.

Material of that sort is removed from the normal sewer outfall and is conducted by a pipe 6 under whatever pressure is necessary and through a control valve 7 into an outlet 8. The outlet discharges into one end of a pond 9 preferably formed by a tank 11. There are various ways of establishing the pond. On a small scale, it takes the form of a tank having a bottom 12, end walls 13 and 14 and sides 15. The pond is preferably open to the atmosphere and is certainly open to the light. On a larger scale, the pond 9 is preferably excavated in the earth and has any suitable sort of lining if necessary to make it sufficiently impermeable to the liquid and other contents of the conduit 6.

The pond preferably is elongated since it is preferred to distinguish the portion 16 near the pipe 8 as the entrance and to distinguish the portion 17 at the opposite end of the elongated pond as the exit. Material flowing out of the pipe 8 joins the pond 9 adjacent the entrance thereof and is received in a forebay 18 segregated from the remainder of the pond by an intervening screen 19. The material received in the forebay is raw sewage containing bacteria and various growth elements usable in the process but may also contain foreign bodies interfering with light transmission and otherwise useless or detrimental. The screen 19 is effective to restrain any obscurant or massive material and keep it in the forebay 18 for ready removal. The remaining, usable material passes through the interstices of the screen 19. Most of the material from the pipe 8, therefore, received through the pipe 8 after an adequate screening finds itself in the entrance end of the pond 9. This material constitutes a nutrient-containing organic waste and all of the usual accompanying bacteria. If left alone, this material tends to oxidize very slowly, since the bacteria therein can obtain oxygen only from the air above the surface level 21 of the pond, and the heavier solids tend to settle away from the atmosphere and form a layer 22 of sludge on the bottom of the pond.

In accordance with our invention, the incoming material is particularly provided with or commingled with an additive in the nature of a photosynthetic micro-organism or group of photosynthetic micro-organisms. It is usually the case that some small or minute quantity of various photosynthetic micro-organisms are present in the incoming material but this is random and by itself ineffective for operation of the process. Consequently, there is added to the influent a supply or charge or inoculum of an effective photosynthetic micro-organism.

Our work has been done with many different such micro-organisms but has been accomplished principally with algae and especially with algae of the group including *Chlorella pyrenoidosa, Scenedesmus obliquus, Euglena gracilis* and comparable algae of an uncomplicated, elementary sort. All of these algae, of course, have the property of utilizing carbon dioxide and other nutrient materials in the presence of light, especially sunlight, not only to discharge oxygen but also to consume ammonia and certain other biochemicals. The algae utilize their intake materials not only for the multiplication of the algal cells in number but also for the increase in size of the algal cells themselves. The size increase is the result of the storing of protein, carbohydrates, fat and other material by the algal individuals whereas the increase in number of cells or the population growth is in accordance with certain well-determined functions. The weight increase of a culture of algae in a period of time is thus due not only to an increase in size of the individuals themselves, but is also due to an increase in number of cells because of propagation.

It has heretofore been seriously doubted that algae, particularly of the types mentioned, can grow effectively or at all or can effectively propagate in a medium as contaminated with other biological forms as organic waste containing the multitudinous bacteria common thereto. We have demonstrated that in accordance with our process not only can algae be grown under such circumstances but they actually flourish so that the symbiosis of the bacteria in the organic waste and the algae is extremely effective.

The charge or inoculation of algae, of the sort indicated, into the entrance of the pond 9 produces some interesting results. During the sunlight hours (when the pond 9 is exposed to sun radiation as a source of light), the algae take carbon dioxide present in the enveloping, liquid medium and by photosynthesis utilize the carbon dioxide to produce an increase in their weight both as individuals and as a group since there is an accompanying population increase. The carbon dioxide utilization results in the discharge of oxygen by the algae. This oxygen, in the fluid medium, is immediately available to the bacteria accompanying the organic waste. The bacteria, whether or not in the presence of light energy, utilize the available oxygen in connection with the carbon from the organic waste to produce and discharge carbon dioxide. They also produce ammonia and certain other biotic products. The carbon dioxide, being directly available in the liquid medium, is taken up by the algae during sunlight hours so that the carbon dioxide-oxygen cycle is immediate, complementary and effectve.

The various nutrients, especially micro-nutrients, necessary for algal growth are all available since they are normally present in organic waste, particularly from human sewage. Even some of the hormones effective to accelerate and control growth are present. It appears, therefore, that all of the nutrients necessary for satisfactory growth of the algae are furnished in abundance, the growth being limited by the quantity of carbon rather than by any of the other nutrients.

Figure 2:
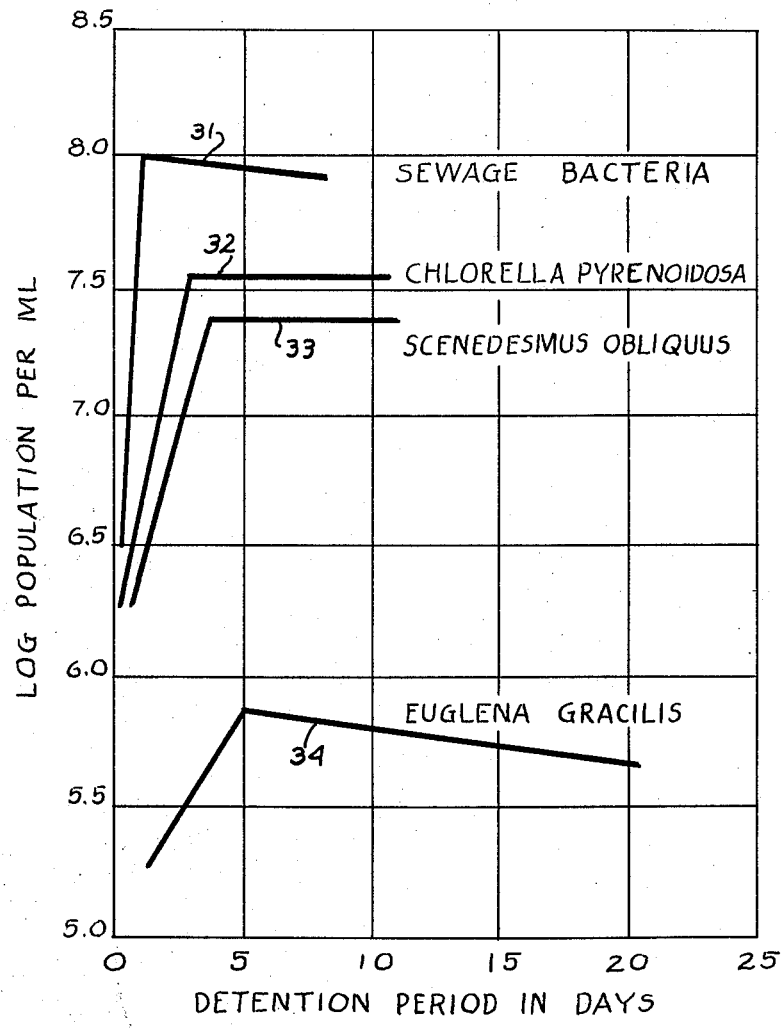
Figure 2 is a graph showing the logarithmic growth period of certain algae in an organic waste-containing bacteria.

Our work has indicated, as shown particularly in Figure 2, that, for a given nutrient supply, cultures of the various mentioned algae in organic waste with a bacteria content increase substantially in the manner indicated. Figure 2 indicates the logarithmic population increase of the algae by milliliter of culture medium during a period measured in days. The graph also indicates the population increase of the bacteria present in the influent organic waste or sewage. For example, the curve 31 shows that the influent bacteria having a population density represented by the logarithm 6.5 increases almost immediately to a population density having a logarithm approximately 8.0 and that thereafter the population logarithm does not increase but remains substantially constant or may even decrease slightly for the ensuing period of several days up to about ten days and thereafter.

In a somewhat comparable fashion, the alga *Chlorella p.*, shown by the curve 32 and having a population density logarithm something under 6.5 when introduced into the pond, has a logarithmic growth for about the first two or three days up to a value the logarithm of which is slightly above 7.5. The growth logarithm is then substantially constant over an ensuing period of many days up to about fifteen days. No change in the growth rate after that period is indicated. Comparably, *Scenedesmus o.* having a somewhat slower rate of increase in population, as shown by the curve 33, follows its increase logarithmically up to a value the logarithm of which is something under 7.5 and then remains substantially constant thereafter. Similarly, *Euglena g.*, shown by the curve 34, is somewhat slower in its growth rate and the logarithm of its growth value extends to something under 6.0 before becoming substantially constant or even declining slightly.

It will be noted that of the algae, the logarithmic growth persists for the first few calendar days in the pond and that the logarithmic growth ceases after a relatively few days, something of the order of two, three or four days. Our work has shown that, in general, and depending on certain other factors such as the insolation at the particular locality, the season of the year, the temperature, the depth dimension of the pond and other parameters, the logarithmic growth period of the customary, usable algae is relatively short extending from something under one day (for example, three quarters of a day) up to about six days.

These values are not highly critical except as they are distinguished from the detention period in many sewage treatment ponds which, unless oxygen is artificially added, is of the order of three or four weeks. It is our determination that the logarithmic growth period of algae in organic waste-containing bacteria is relatively short being of the order of one to six days, approximately. Furthermore, it is established that different algae have different growth rates in the bacteria-contaminated medium. For example, *Chlorella p.* has a large increase in population in a short interval of time so that the detention period necessary to encompass the logarithmic growth period of Chlorella is relatively short. *Euglena g.*, for example, takes approximately twice the detention period to encompass the logarithmic growth thereof.

This is of consequence since the carbon dioxide intake and the oxygen production of the algae is by far the greatest during the logarithmic growth period of the algae. After the logarithmic growth period has been passed and the algal individuals are relatively old, the carbon dioxide intake and the oxygen production thereof are relatively static. In fact, there may be a net loss of oxygen in a given environment if the algae have passed their logarithmic growth period.

For reasons of economics, it is desired to make the pond as small as possible and it is necessary for conservancy in general to make the process relatively fast. Preferably, therefore, we introduce *Chlorella p.* as the inoculating alga. Since the logarithmic growth period when this alga is particularly useful is relatively short, we preferably flow the liquid material through the pond 9 in a time interval which is about as great as but is only slightly longer than the logarithmic growth period of the inoculating algae so that the desired kind of algae have an appropriate time period within which to accomplish logarithmic growth. The maximum yield may not be precisely at the point of maximum logarithmic growth and for greatest efficiency the maximum yield point may be preferred. This is still on the logarithmic curve. If a mixed culture containing Chlorella p. and Euglena g. for example, is started at the entrance of the pond, the Chlorella have an adequate opportunity to reproduce themselves logarithmically as the traverse of the pond is made, whereas the Euglena do not. Eventually the Euglena culture will be diluted out or displaced, giving way to Chlorella.

This factor is also utilized to protect the desired algal culture against unfavorable contaminants. For example, rotifers come in with the influent material and are deleterious to the algal culture. However, the growth period of rotifers is considerably longer than that of Chlorella, for example, so that whereas the Chlorella multiply under favorable conditions, the rotifers are eventually carried along and diluted out before reproduction can occur and before the colony can increase. The net result is that the pond 9 contains a body of a sewage-supplied nutrient medium effective for the production during light radiation of an increase, preferably logarithmic, in the algal population.

As the algae and organic waste progress from the entrance of the pond toward the exit thereof, there is a continuous interchange of oxygen and carbon dioxide during the time when light is radiated onto the pond surface. During the night or when light is not available, the algae cannot photosynthesize oxygen, yet the bacteria, not being photosynthetic, continue to produce carbon dioxide. That means that the pH value of the pond varies from day to night. The pH variation is not, however, quite in accordance with the production of carbon dioxide by the bacteria since the carbon dioxide used by the algae is also partly supplied from the air above the pond. In any event, the rate of symbiotic interchange is such that, in general, the pH of the pond is suitable for the culture conditions to continue effectively.

During this time, the solid particles in the influent organic waste tend to settle onto the bottom of the pond, forming the sludge layer 22. Many or most of the bacteria are in or about the neighborhood of this layer and since such bacteria are not photosynthetic, it is economically wasteful to have the pond shallow enough so that the light penetrates through the sludge layer 22. It is proper to make the layer of fluid material above the sludge layer of approximately the right depth for the penetration of light down to the sludge layer but not into it.

The light penetration is controlled by the turbidity of the fluent material and various other concomitant factors. It has been found that this depth varies with the character of the light, the time of the year, the location, meteorological conditions and comparable factors. In general, the preferred depth of the liquid material in the pond 9 (or the position of the level 21) is preferably such that the liquid material is from about two inches to about twenty-four inches in depth. This varies and the mentioned limits are not critical except as they are distinguished from pond depths of three to twelve feet or so normally utilized in sewage disposal ponds.

It is preferred that the sludge layer not become excessively thick or built up but rather that the rate of utilization thereof by the bacteria be such relative to the rate of influx of new material that the sludge layer remains approximately of a uniform thickness. In addition, it is preferred that this layer not remain entirely static since the bacteria therein must necessarily be supplied with oxygen and the oxygen is primarily available from the algae in the supernatant liquid. The algae themselves settle at a very slow rate so that under many circumstances, it is desired to stir the sludge layer 22 in order to assure a more intimate commingling of the bacteria, the algae and their respective nutrients. For that reason, there is provided, for example, a motor 41 driving an agitating propeller 42 in the liquid. This agitation is relatively gentle since it is not desired to increase the turbidity of the liquid greatly as that cuts down the penetration of the light. The aim is to stir up the sludge layer just sufficiently so that oxygen may penetrate thereto quite readily so as to be in the immediate vicinity of the utilizing bacteria and also in order that the carbon dioxide, ammonia and other nutrients released by the bacteria can readily be captured by the algae in the adjacent liquid.

Symbiosis proceeds during the supply of light to the pond 9 and during the gentle traverse of the pond contents from the entrance toward the exit 17. The time of traverse is preferably, as indicated, about the same as the period of logarithmic growth of the algae. Thus, the material which has travelled from the entrance to the exit of the pond comprises a largely increased population of Chlorella (or other algae) representing a substantial supply of carbohydrate, protein and fat material. The liquid is relatively free of contaminants and there is some sludge material entrained.

In accordance with the invention, within and adjacent the exit 17 of the tank, there is provided a transverse weir 43 extending from the bottom of the tank and between the sides thereof up to the desired level 21 of the material. The flow rate is such that there is a predetermined discharge over the top of the weir into a settling chamber 44 at the exit end of the pond 9. In the settling chamber, there is substantially no agitation so that there is a sedimentation of a substantial layer 46 to the bottom and a supernatant zone 47 of liquid containing algae and accompanying materials of similar gravity.

Also, in accordance with our invention, in order to provide an adequate seeding or culture supply of algae, and also to assist somewhat in regulating the rate of flow through the pond, we provide a recirculation of some of the otherwise effluent material. Especially since it is desired not to discharge substantial quantities of sludge, there is disposed adjacent the bottom part of the settling chamber 47 an intake pipe 48 leading to a pump 49 suitably driven and discharging through a conduit 51 and a nozzle 52 into the forebay 18. Since the intake 48 is in the sludge zone 46, much of the sludge which gathers is removed from the settling tank and is recycled for utilization by the bacteria. If the sludge production is excessive, some may be discharged from the system by a branch in the conduit 51. Furthermore, the counterflow of the fluid through the conduit 51 acts somewhat to stir up the forebay 18 so that the material therein is readily passed through the screen 19 or if of too large compass is easily dislodged toward the surface of the forebay. The sludge is returned to the entrance end of the pond 9 and seeding or reintroduction of algae such as Chlorella is accomplished, since both of these materials pass readily through the screen 19 for recycling.

Other material in the settling chamber 47 and, if desired including only a small amount of sludge, is withdrawn from the pond for further processing. Preferably, there is an off-take pipe 53 at a convenient height below the surface so that liquid effluent is carried by a conduit 54 into a recovery and separating structure 56. Of the materials flowing through the conduit 54, two or three major separations are desired. The algal cells are preferably separated, the liquid effluent is separated and so is solid material such as humus or other deposit if there is substantial carryover thereof through the pipe 53.

There are various ways of separating the algal cells from the remaining material. One way is to centrifuge the effluent, flinging the solid cells to one side while the liquid material passes on. The cells then are effectively dried, usually by air drying or by artificial heat and are then available for use. It is found that the algae, due to energy absorption from the sun or other light source, provide nutrients at a much higher energy level than those contained in the influent organic waste or sewage. The constituency of the algae is such that they are roughly on the order of 50% protein with much of the remainder being carbohydrates, fat or fatty material. Such algae make good animal food conceivably even being suitable for human consumption as well.

Another separating system is to treat the effluent from the conduit 54 with a chemical material such as alum which serves as a coagulant and flocculating agent so that the algae cells tend to agglomerate in groups which can easily be removed from the remaining liquid. It is also possible to dry the algae directly by utilization of heat but that is normally not economically feasible because of the large amount of liquid. It is also possible to utilize filters of various sorts such as biological filters but, in any event, the effect of the step is to separate the algal cells from the other material.

As to the humus, that is separated in any convenient way, for example, by settling, leaving a relatively clear, usable liquid. The liquid is immediately available for use in processing, for example, as a coolant for steam condensing, irrigation and the like. When further subjected to ordinary water treating processes, such as sand filtration, taste and odor removal, and chlorination, the liquid effluent is usable as domestic water for human consumption. The humus is normally used in agriculture and serves as a satisfactory and proper additive for the soil.

The organic waste supplied to our process is usually contaminated with various sorts of bacteria, some of which are useful in the process, although many are inimical to animal life. It has been observed, however, that the coliform bacteria, particularly, do not reproduce well within the period of detention of the organic waste in the pond 9 or within the period necessary for the logarithmic growth cycle of the algae. Whatever inimical bacteria may come through the discharge conduit 54 into the recovery and separation mechanism 56 can readily be rendered ineffectual by heat drying of the algal cells, the heat being sufficient to render the cells sterile so far as harmful bacteria are concerned. The filtration of the liquid effluent and its chlorination are also effective to dispose of deleterious bacteria just as those steps act in ordinary water treatment plants.

In accordance with the invention, there is provided a process effective to treat organic waste economically. There is provided a process for affording a large supply of protein, carbohydrate and fat containing material, such as algae. There is afforded a process in which the liquid carrier of the sewage is reclaimed as usable water, a factor of great importance in parts of the country. There is also provided a process in which solar or other light energy is transformed into usable form in the shape of food and humus.

A study of the necessary size and cost of the pond 9 and of its attendant equipment indicates that very much less than the usual area is usually necessary for the symbiotic process of sewage disposal, so that even if the algal production were not of consequence, there would be an economic saving over conventional ponding processes in the mere symbiotic treatment of the organic waste for further disposition. Considered from another side, the production of protein, fat and carbohydrates is carried on at a mass scale without the necessity of supplying carbon dioxide and other nutrient media in an expensive fashion. The carbon dioxide, ammonia and other necessary materials to sustain the algal culture are otherwise waste products and need not be separately and individually supplied.

From another aspect, the reclamation of water for reuse is in itself economically feasible in certain parts of the world and in parts of this country where water is scarce and costs of handling it are high. Also, where algal-supporting nutrients are in water to be discharged, this process can be used to hold back the algal nutrients so that the water can be discharged without promoting outside algal growth. Finally, there is afforded in accordance with the process a means utilizing solar energy to afford a useful product. All of these various factors are interrelated. The present process is especially concerned and it emphasizes the economical and appropriate disposition of organic waste containing bacteria and the production of algae or of comparable photosynthetic micro-organisms effectively useful for foods. It is also possible that the reuse of water or the utilization of sunlight could be the predominant factors requiring some modifications in the process but, in general, the process as presented herein is effective and economical in operation.

What is claimed is:

1. A process of photosynthetic conversion of organic waste by algal-bacterial symbiosis comprising establishing a pond open to the air and sun, flowing bacteria-containing organic waste into said pond, supplying said pond with a photosynthetic micro-organism, withdrawing effluent from said pond after an average detention period therein based upon oxygen supplied by said photosynthetic micro-organism, and separating said effluent substantially into photosynthetic organisms and liquid.

2. A process of photosynthetic conversion of organic waste by algal-bacterial symbiosis comprising establishing a pond open to the air and sun and having an entrance and an exit spaced from each other, flowing raw sewage containing bacteria into said pond through said entrance, supplying said pond with a photosynthetic micro-organism, withdrawing effluent from said pond through said exit after a predetermined average detention period therein, recirculating some of said withdrawn effluent back to said pond through said entrance, and separating the remainder of said effluent substantially into photosynthetic organisms and liquid.

3. A process of photosynthetic conversion of organic waste such as raw sewage by algal-bacterial symbiosis comprising establishing an elongated pond having an entrance and an exit spaced from each other, said pond being exposed to light, flowing raw sewage into said pond through said entrance, supplying said pond with bacteria, supplying said pond with photosynthetic micro-organisms, withdrawing a portion of effluent from said pond through said exit and returning said portion of effluent to said pond through said entrance, and withdrawing another portion of effluent from said pond through said exit only after a predetermined detention period.

4. A process of photosynthetic conversion of organic waste by algal-bacterial symbiosis comprising establishing a pond open to light, flowing organic waste in the nature of raw sewage into said pond, supplying said pond with bacteria, supplying said pond with photosynthetic micro-organisms, and withdrawing effluent from said pond only after an average detention period from about one day to about six days.

5. A process of photosynthetic conversion of organic waste by algal-bacterial symbiosis comprising establishing a pond open to light, flowing a fluent organic waste in the nature of raw sewage through said pond in from about one day to about six days, supplying said pond with bacteria, supplying said pond with photosynthetic micro-organisms, and maintaining a countercurrent flow of a portion of said fluent material.

6. A process of photosynthetic conversion of organic waste by algal-bacterial symbiosis comprising establishing a pond open to the sun and from about two inches to about twelve inches deep, flowing a fluent organic waste in the nature of raw sewage through said pond in a predetermined direction and at a rate to require an average detention period from about one day to about six days, circulating in said pond some of the pond material after said detention period in a direction opposite said predetermined direction, supplying said pond with bacteria, supplying said pond with photosynthetic microorganisms, and withdrawing material from said pond only after said detention period.

7. A process of photosynthetic conversion of organic waste by algal-bacterial symbiosis comprising establishing a pond open to the sun, supplying said pond with fluent organic raw sewage containing bacteria, supplying said pond with algae, and detaining said supplied material in said pond only during the substantially logarithmic growth period of said algae.

8. A process of photosynthetic conversion of organic waste by algal-bacterial symbiosis comprising establishing a pond open to the sun, supplying said pond with organic sewage containing bacteria, supplying said pond with fast growing organisms beneficial algae and with slow growing detrimental to said algae, and detaining said supplied material in said pond more than the logarithmic growth period of said beneficial algae and less than the logarithmic growth period of said detrimental organisms.

9. A process of photosynthetic conversion of organic waste by algal-bacterial symbiosis comprising establishing a pond open to the sun, supplying said pond with organic raw sewage containing bacteria, supplying said pond with algae having different logarithmic growth rates, and withdrawing material from said pond when the average detention time thereof is of the order of the shorter of said logarithmic growth rates.

10. A process of photosynthetic conversion of organic waste by algal-bacterial symbiosis comprising establishing a pond of the order of one foot deep and having an entrance and an exit spaced from each other and subject to light radiation, supplying said pond through said entrance with organic raw sewage containing bacteria, supplying said pond with algae having a relatively short logarithmic growth period, withdrawing material from said pond through said exit after a detention period in said pond longer than said growth period, recirculating material from the exit of said pond to the entrance thereof, and separating algae from said withdrawn material.

11. A process of photosynthetic conversion of organic waste by algal-bacterial symbiosis comprising establishing a pond of the order of one foot deep and subject to light radiation, supplying said pond with organic waste in the nature of raw sewage containing bacteria, supplying said pond with algae largely *Chlorella pyrenoidosa*, detaining said material in said pond for about one to six days, withdrawing said material from said pond, and separating algae from said withdrawn material.

12. A process of photosynthetic conversion of organic waste by algal-bacterial symbiosis comprising commingling a fluent organic waste containing bacteria with algae, subjecting said commingled material to light for a period equal to the time of sunlight during from one to six calendar days, and immediately thereafter separating algae from said commingled material.

13. A process of photosynthetic conversion of organic waste by algal-bacterial symbiosis comprising commingling a fluent organic waste containing bacteria with algae, flowing said commingled material through an open-air pond subject to light radiation during which time sludge forms on the bottom of said pond, keeping the surface of said pond free from light-obscuring material, keeping the depth of light penetration of said pond about at the top level of said sludge, withdrawing supernatant material from said pond after a predetermined detention period therein, and removing algae from said withdrawn material.

14. A process of photosynthetic conversion of organic waste by algal-bacterial symbiosis comprising supporting algate from the group consisting of *Chlorella pyrenoidosa, Euglena gracilis* and *Scenedesmus obliquus* only during the logarithmic growth period thereof on raw sewage containing bacteria while simultaneously supplying said bacteria with oxygen derived from said algae.

References Cited in the file of this patent

Publication: Ludwig et al., "Role of Algae in Sewage Oxidation Ponds," published January 1952 at Washington, D. C., in Scientific Monthly, vol. 74, pages 3 through 6.

Publication: "Algal Culture" (Burlew), Publication 600 of Carnegie Institution of Washington, D. C., (July 15, 1953), pages 14, 15, 166 through 176, 333, 344.